US012809348B2

(12) United States Patent
Kim et al.

(10) Patent No.: US 12,809,348 B2
(45) Date of Patent: Nov. 24, 2026

(54) METHOD FOR OPERATING CELL BASED MOBILITY PRODUCTION SYSTEM

(71) Applicants: Hyundai Motor Company, Seoul (KR); Kia Corporation, Seoul (KR)

(72) Inventors: Seung Hyeon Kim, Goyang-si (KR); Ye Eun Kim, Anyang-si (KR); Suk Jae Youn, Yongin-si (KR); Hyun Dong Park, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 789 days.

(21) Appl. No.: 17/861,767

(22) Filed: Jul. 11, 2022

(65) Prior Publication Data

US 2023/0067801 A1 Mar. 2, 2023

(30) Foreign Application Priority Data

Aug. 27, 2021 (KR) ........................ 10-2021-0113871

(51) Int. Cl.
*G05B 19/416* (2006.01)

(52) U.S. Cl.
CPC .................... *G05B 19/4166* (2013.01); *G05B 2219/50393* (2013.01)

(58) Field of Classification Search
None
See application file for complete search history.

(56) References Cited

U.S. PATENT DOCUMENTS

| | | | | |
|---|---|---|---|---|
| 11,640,567 | B2 | 5/2023 | Yamazaki | |
| 2009/0112343 | A1 * | 4/2009 | Yuan | G05B 19/41865 700/115 |
| 2018/0259945 | A1 * | 9/2018 | Sillay | G06F 3/04847 |
| 2022/0245543 | A1 | 8/2022 | Youn et al. | |

FOREIGN PATENT DOCUMENTS

| | | | |
|---|---|---|---|
| JP | H07314267 | A | 12/1995 |
| JP | 2009142949 | A | 7/2009 |
| JP | 2009282914 | A | 12/2009 |
| JP | 2011070407 | A | 4/2011 |
| JP | 2012093865 | A | 5/2012 |
| JP | 2012218093 | A | 11/2012 |
| JP | 2017117332 | A | 6/2017 |
| JP | 2020151770 | A | 9/2020 |
| KR | 20040092568 | A | 11/2004 |
| KR | 20220109925 | A | 8/2022 |
| WO | 2020136875 | A1 | 2/2020 |

* cited by examiner

*Primary Examiner* — Sean Shechtman
(74) *Attorney, Agent, or Firm* — Slater Matsil, LLP

(57) ABSTRACT

An embodiment method of operating a cell-based mobility production system for producing various types of mobilities includes assigning works required in each cell of a plurality of cells connected in series or in parallel that vehicle bodies need to go through based on the type of the mobility to be produced, determining a feeding order of the vehicle bodies based on the assigned works, and reassigning the works required in each cell that the vehicle bodies to be fed need to go through based on the determined feeding order, wherein each of assigning the works, determining the feeding order, and reassigning the works is performed by a processor.

18 Claims, 6 Drawing Sheets

METHOD FOR OPERATING CELL BASED MOBILITY PRODUCTION SYSTEM

CROSS-REFERENCE TO RELATED APPLICATIONS

This application claims the benefit of Korean Patent Application No. 10-2021-0113871, filed on Aug. 27, 2021, which application is hereby incorporated herein by reference.

TECHNICAL FIELD

The present invention relates to a method of operating a cell-based mobility production system.

BACKGROUND

Conventionally, an integrated mass production method of selected models centered on a conveyor has been maintained. In a conventional case, vehicles are fed in a predetermined sequence, and production is carried out by the repetitive operations in each process designated to respective vehicle models by a single work assignment until a finished vehicle is produced.

When vehicles are produced by a single work assignment designated to the respective vehicle models, a work delay occurs due to a difference in working times between vehicle models if several vehicle models are simultaneously produced (mixed production).

Accordingly, innovation in the manufacturing methods is necessary to move away from the traditional vehicle production toward quick and efficient production of a variety of vehicle models.

An example of such a manufacturing method is a cell-based smart factory. In the cell-based smart factory, a unique work may be performed in each cell, the cells may be arranged in various ways in the factory, and the schedule regarding what cells vehicle bodies to be fed will go through may be readily changed.

However, even in such a cell-based process, a well-prepared overall production plan is called for to minimize bottlenecks caused by vehicle model changes and increase production efficiency. Accordingly, a method of quick and accurate simulation and establishing of production plans in advance is needed.

The matters described above as the technical background are intended only for a better understanding of the background of the present disclosure and should not be taken as an acknowledgment that they pertain to the conventional art already known to those skilled in the art.

SUMMARY

The present invention relates to a method of operating a cell-based mobility production system. Particular embodiments relate to a method of operating a cell-based mobility production system for promoting improvement in the operating rate and productivity of a smart factory by reassigning works required in each cell that respective vehicle bodies need to go through in consideration of determined feeding order to prevent work delays occurring at each point where vehicle models change due to different working times required to perform a process for the respective vehicle models in the operation of a smart factory system for producing various types of mobilities through a plurality of cells connected in series or parallel.

An embodiment of the present invention provides a method of operating a smart factor system for producing various types of mobilities through a plurality of cells connected in series or parallel to improve an operating rate and productivity of a smart factory by reassigning works required in each cell that respective vehicle bodies to be fed need to go through in consideration of a determined feeding order to prevent a work delay occurring at every point where vehicle models change due to different working times in performing each process for the respective vehicle models.

According to an embodiment of the present invention, there is provided a method of operating a cell-based mobility production system for producing various types of mobilities through a plurality of cells connected in series or parallel in a processor, and the method includes assigning works required in each cell that the vehicle bodies matched by respective mobility need to go through, determining a feeding order of the vehicle bodies in consideration of the assigned works, and reassigning the works required in each cell that respective vehicle bodies to be fed need to go through in consideration of the determined feeding order.

In the reassigning of the works, the works required in each cell for the vehicle bodies to be fed may be reassigned such that the total production time of the vehicle bodies to be fed according to the determined feeding order satisfies the minimum production time.

After the reassigning of the works, detecting a work delay in a specific cell when the vehicle bodies are fed according to the determined feeding order may be further included, and the reassigning of the works onward may be performed again when a work delay occurs.

In the reassigning of the works, a plurality of expected reassignments in which the works required in each cell for the respective vehicle bodies to be fed according to the determined feeding order are reassigned may be prepared, and an expected reassignment in which the total production time of the vehicle bodies to be fed satisfies the minimum production time may be selected as an optimal reassignment among the plurality of expected reassignments.

In the determining of the feeding order of the vehicle bodies, a plurality of expected production plans different from each other in the feeding order of the vehicle bodies may be prepared, and an expected production plan having the shortest working time may be selected as an optimal expected production plan among the expected production plans.

In the determining of the feeding order of the vehicle bodies, a plurality of expected production plans different from each other in the feeding order of the vehicle bodies may be prepared, and an expected production plan having the shortest standby time between the vehicle bodies to be fed may be selected as an optimal expected production plan among the expected production plans.

In the reassigning of the works, the works required in each cell for the vehicle bodies to be fed may be reassigned in consideration of the determined feeding order and workload difference between the preceding and following vehicle bodies.

In the reassigning of the works, the works required in each cell for the vehicle bodies to be fed may be reassigned in consideration of the determined feeding order and possible and impossible works in the respective cells.

According to another embodiment of the present invention, there is provided a method of operating the cell-based mobility production system for producing various types of mobilities through a plurality of cells connected in series or parallel, and the method includes assigning works required in each cell that the vehicle bodies matched by respective mobility need to go through, determining a feeding order of vehicle bodies in consideration of the assigned works, reassigning the works required in each cell that the respective vehicle bodies to be fed in consideration of the determined feeding order need to go through, and planning a logistics flow of parts required in each cell in consideration of the determined feeding order and reassigned works.

After the planning of the logistics flow, detecting an occurrence of a logistic issue including a collision or congestion in the logistics flow when the vehicle bodies are fed according to the feeding order may be further included, and the planning of the logistics flow onward may be performed again when a logistics flow issue arises.

After the planning of the logistics flow, detecting a work delay in a specific cell when the vehicle bodies are fed according to the feeding order may be further included, and the reassigning of the work onward may be performed again when a work delay occurs.

After the planning of the logistics flow, detecting the possibility or impossibility of achieving a target production amount of the mobility when the vehicle bodies are fed according to the feeding order may be further included, and the reassigning of the work onward may be performed again when achieving the target production amount is determined to be impossible.

According to the method of operating the cell-based mobility production system, in the operation of a smart factory system for producing various types of mobilities through a plurality of cells connected in series or parallel, embodiments of the present invention may promote improvement in the operating rate and productivity in a smart factory by reassigning the works required in each cell that the respective vehicle bodies to be fed need to go through in consideration of the determined feeding order to prevent a work delay occurring at every point where vehicle models change due to different working times in performing each process for the respective vehicle models.

DETAILED DESCRIPTION OF ILLUSTRATIVE EMBODIMENTS

Specific structural or functional descriptions of the embodiments of the present invention disclosed in the present specification or application are presented by way of examples only for the purpose of describing the embodiments according to the present invention, and the embodiments according to the present invention may be implemented in various forms and should not be construed as being limited to the embodiments described in the present specification or application. In the following, embodiments of the present invention will be described in detail with reference to the accompanying drawings.

Here, a sequence SEQ refers to an order in which vehicles are fed and will be denoted by Seq hereinafter. The embodiment method of operating the present invention may be performed by a controller (processor) but is not limited thereto.

Figure 1:
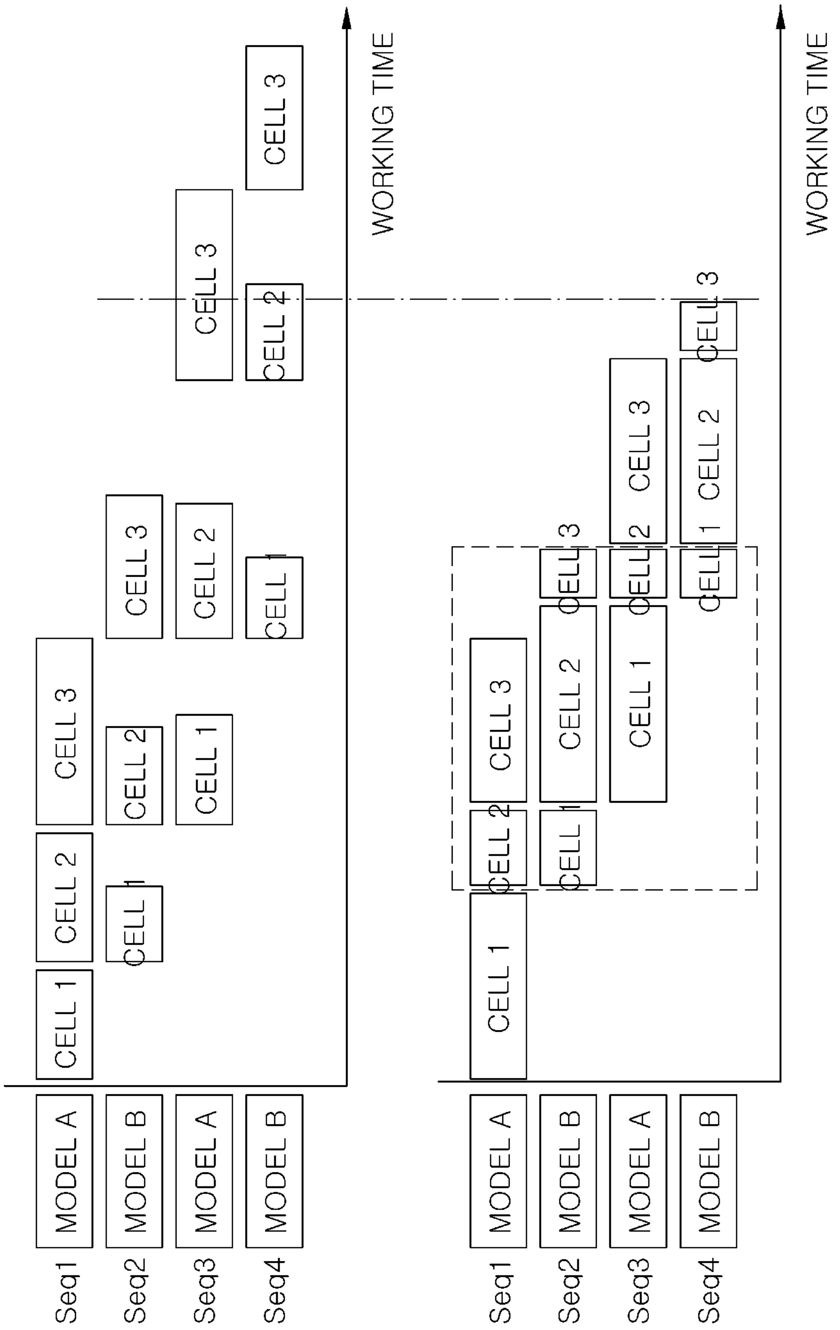
FIG. 1 is a view showing production systems to which a method of operating a cell-based mobility production system according to embodiments of a conventional invention and the present invention respectively.
Figure 2:
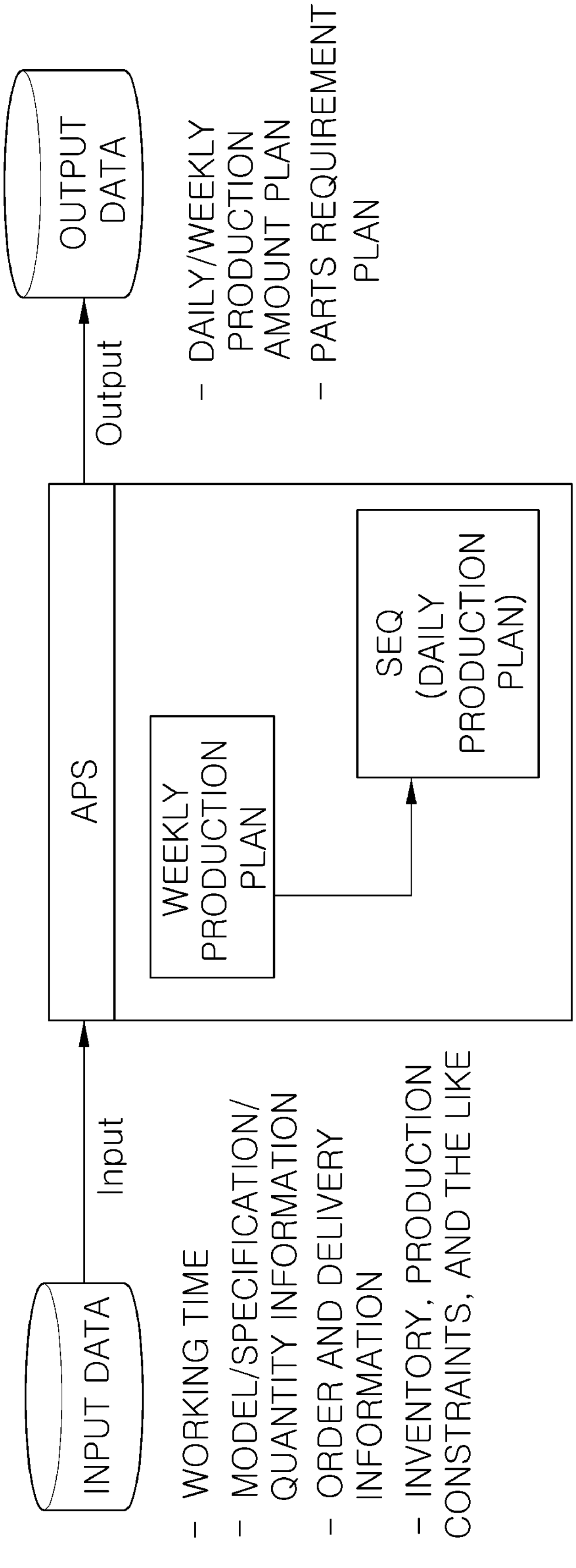
FIG. 2 is a view showing steps of determining a feeding order of vehicle bodies in a cell-based mobility production system according to an embodiment of the present invention.
Figure 3:
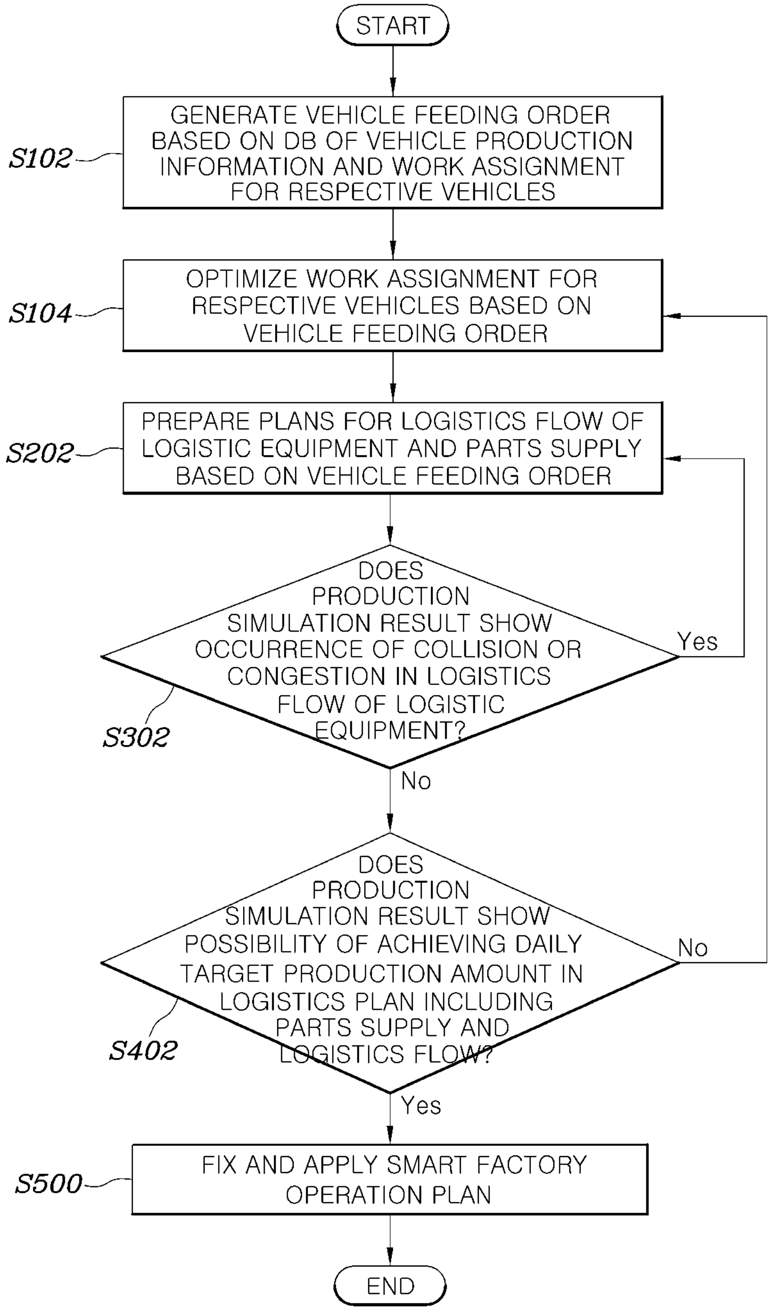
FIG. 3 is a flowchart of a method of operating a cell-based mobility production system according to an embodiment of the present invention.
Figure 4:
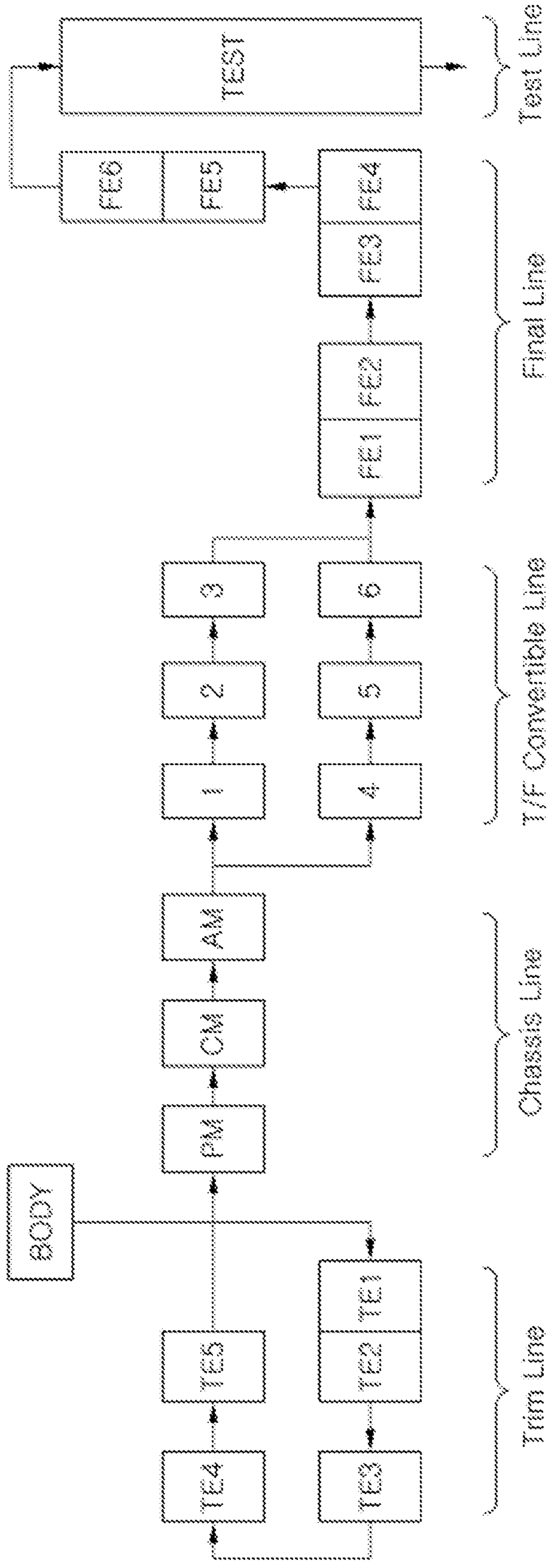
FIG. 4 is a view showing a configuration of a cell-based mobility production system.
Figure 5:
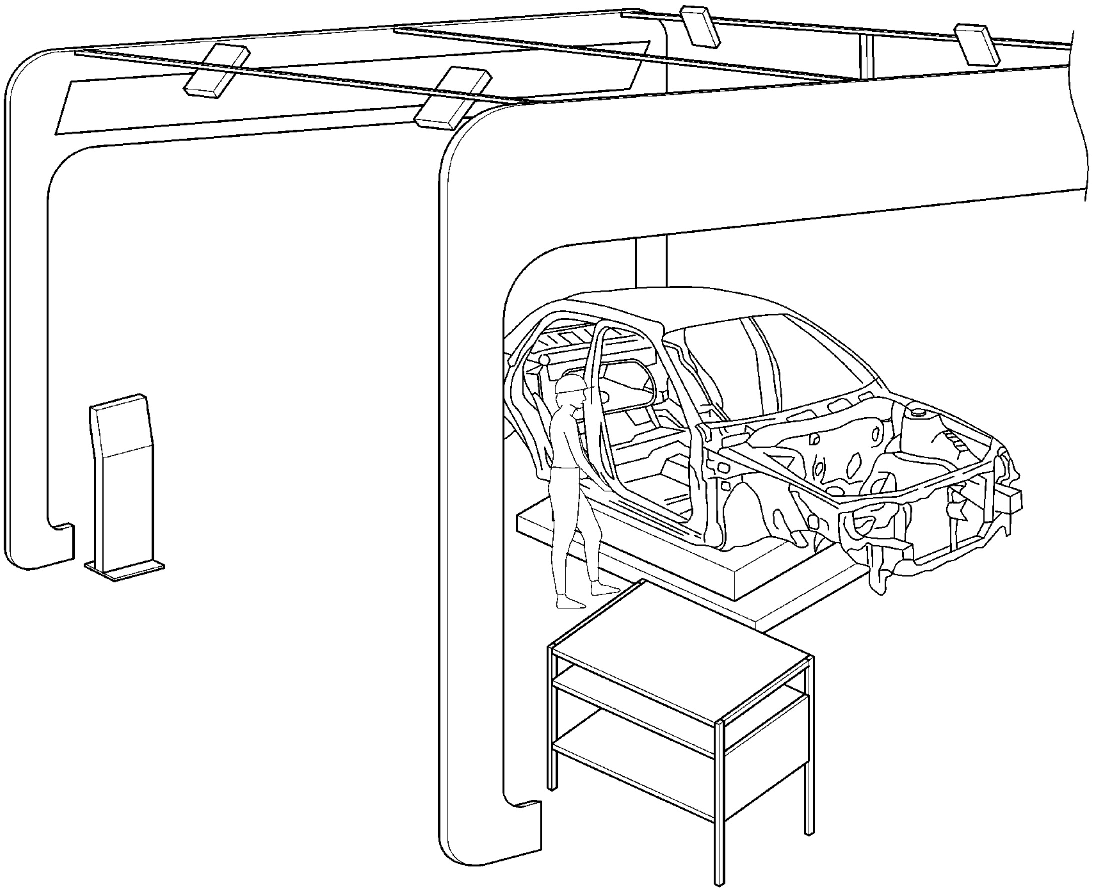
FIG. 5 is a view showing a manual cell of a cell-based mobility production system according to an embodiment of the present invention.
Figure 6:
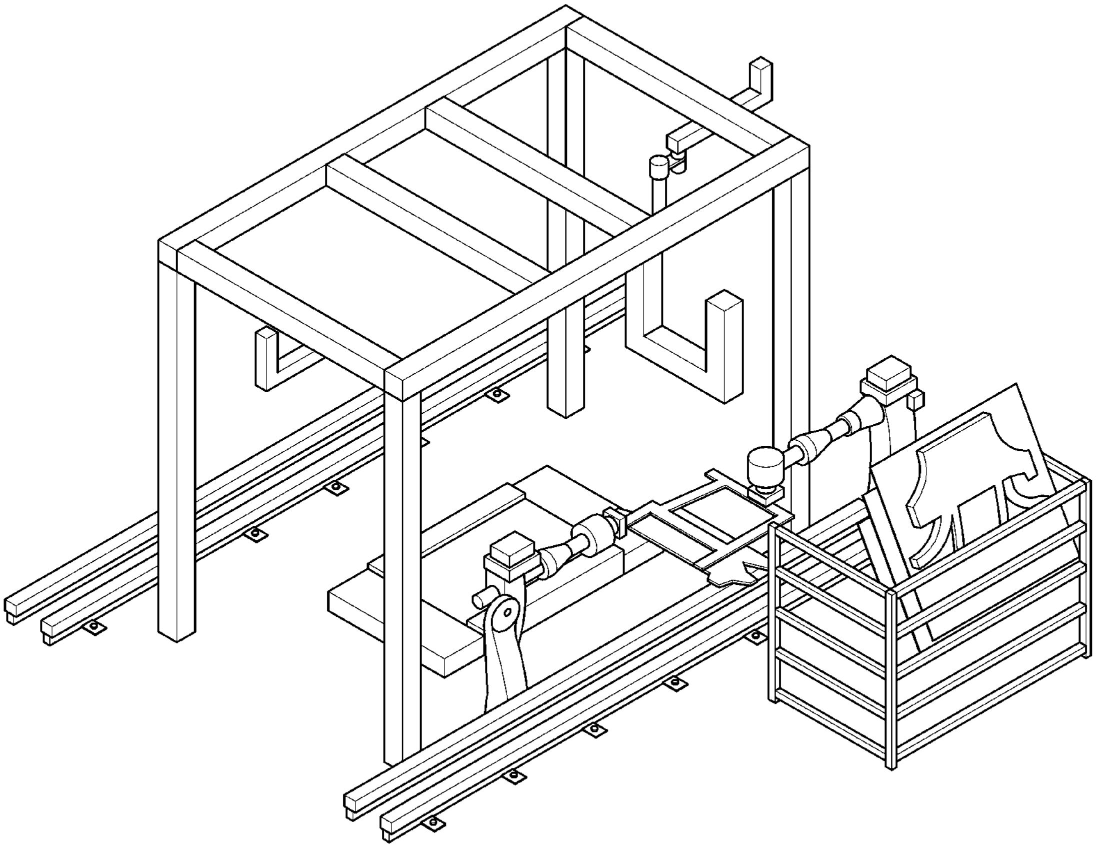
FIG. 6 is a view showing an automated cell of a cell-based mobility production system according to an embodiment of the present invention.

FIG. 1 is a view showing production systems to which a method of operating a cell-based mobility production system according to embodiments of a conventional invention and the present invention, respectively, FIG. 2 is a view showing steps of determining a feeding order of vehicle bodies in a cell-based mobility production system according to an embodiment of the present invention, FIG. 3 is a flowchart of a method of operating a cell-based mobility production system according to an embodiment of the present invention, FIG. 4 is a view showing a configuration of a cell-based mobility production system, FIG. 5 is a view showing a manual cell of a cell-based mobility production system according to an embodiment of the present invention, and FIG. 6 is a view showing an automated cell of a cell-based mobility production system according to an embodiment of the present invention.

FIG. 4 is a view showing a production system to which a method of operating a cell-based mobility production system is applied and shows a configuration of the cell-based smart factory production system rather than a conventional conveyor method. As shown in FIG. 4, the cell-based mobility production system to which embodiments of the present invention are applied is composed of a plurality of cells. Here, the cell is a space in which a worker or robot works independently and a space in which a specific process is performed. Each of the cells may be arranged in series or parallel. Accordingly, the cell-based mobility production system may pursue both flexibility and efficiency in mobility production.

An example of the works performed in each cell shown in FIG. 4 is as follows.

TABLE 1

| classification | TE1 | TE2 | TE3 | TE4 | TE5 | PM | CM | AM |
|---|---|---|---|---|---|---|---|---|
| representative work | door removal<br>wiring<br>plug/pad | sunroof<br>RR glass<br>roof rack<br>underpad | IEB<br>break T/GATE<br>CAB | headlining<br>C/PAD<br>blower<br>rear bumper | carpet/fixed glass/battery | break<br>tube<br>engine room work<br>underbody | chassis<br>decking/<br>fastening | WCCU<br>wiring<br>cable<br>wheel guard |
| T/F Convertible Cell | | | FE1 | FE2 | FE3 | FE4 | FE5 | FE6 |
| 1/4<br>FRT | 2/5<br>CRT SIDE | 3/6<br>RR | FEM<br>RR seat | FRT sear<br>FRT bumper | door installation<br>styling wheel | WS glass<br>tire mounting | fluid injection<br>key coding | FRUNK<br>electrical |

TABLE 1-continued

| | | | | | |
|---|---|---|---|---|---|
| SIDE<br>engine room<br>interior trim | wiring<br>W/STRIP<br>striker | SIDE<br>T/GATE<br>luggage<br>seal side | console<br>auxiliary<br>battery | back panel<br>molding<br>luggage<br>tray | equipment<br>coding/<br>inspection |

As shown in TABLE 1, TE1 to TE5 may be connected in series and may form a trim line. And, PM to AM may be connected in series as a chassis line.

On the other hand, as shown in TABLE 1 and FIG. 4, both trim and final processes are performed in the T/F convertible cell which is composed of cells 1 to 6 connected in series.

And, FE1 to FE6 represent a final line, and final installation works may be performed in cells connected in series. As described above, the cell-based mobility production system to which embodiments of the present invention are applied has a basic assembly sequence and a cell arrangement.

FIG. 5 is a view showing a manual cell in a cell-based mobility production system according to an embodiment of the present invention. As shown in FIG. 5, the manual cell is a manual space in which a worker performs, in person, a process on a vehicle body moved by logistics equipment such as an automated guided vehicle (AGV) or an automated mobile robot (AMR).

The manual cell shown in FIG. 5 is composed of a kiosk provided with an interface and a touch display for inputting and outputting information on a work process, a current work, and production information, a moving body moved by an AGV or an AMR, and a logistics space from which parts required for production are supplied.

FIG. 6 is a view showing an automated cell in the cell-based mobility production system according to an embodiment of the present invention. As shown in FIG. 6, the automated cell is an automated space in which a robot performs a process on a vehicle body moved by the AGV or the AMR.

FIG. 1 is a view showing production systems to which a method of operating a cell-based mobility production system is applied according to embodiments of a conventional invention and the present invention, respectively. The operating method is a method of operating a system for protruding various types of mobilities through a plurality of cells connected in series or parallel in a processor and includes assigning works required in each cell that the vehicle bodies matched by respective mobility need to go through, determining a feeding order of vehicle bodies in consideration of the assigned works, and reassigning the works required in each cell that the respective vehicle bodies to be fed need to go through in consideration of the determined feeding order.

As shown in the upper part of FIG. 1, the production system to which the method of operating the cell-based mobility production system of the conventional invention is applied is configured to achieve the best efficiency when a single vehicle model is produced in a production line. Accordingly, since the production system to which the conventional invention is applied achieves the best efficiency in producing model A only, the target production vehicle may be produced within the minimum working time when only the same model A is continuously fed.

However, as shown in the upper part of FIG. 1, the method of operating the conventional production system may not achieve the best efficiency when production shifts from model A to model B. The reason is that the works for the respective vehicles are not assigned for a mixed production (production of a plurality of vehicle models including models A and B).

Specifically, as shown in the upper and lower parts of FIG. 1, cell-to-cell movement order is such that both models A and B go through Cell 1-Cell 2-Cell 3. The models A and B are fed according to Seq. Only two vehicle models (models A and B) are presented for illustration in the present embodiment, but three or more models may be sequentially fed according to Seq.

And, as shown in the upper part of FIG. 1, the work in Cell 1 of Seq 2 (model B is fed) starts after work in Cell 1 of Seq1 (model A is fed) is completed, and work starts in Cell 2 of Seq 2 (model B is fed) after work in Cell 2 of Seq 1 (model A is fed) is completed. The same holds in other cells (the working time of model B is assumed to be shorter than that of model A in the present embodiment).

By the way, the total working time of the processes performed in Cells 1, 2, and 3 of model B of Seq 2 is different from the total working time of the processes performed in Cells 1, 2, and 3 of model A of Seq 1 due to the difference in working process performed in each cell for the respective models (the working time for model B is assumed to be shorter than that for model A in the present embodiment).

Accordingly, if the method of operating the production system based on a single work assignment optimized for model A is applied to the mixed production system and model A of Seq 1 is processed in Cell 2 after work in Cell 1 is completed, model B of Seq 2 fed following model A may not be fed to Cell 2 and stand by immediately after work in Cell 1 is completed due to the shorter working time for model B than model A, and idle time is generated and accumulated.

That is, the difference in working times between different models is not duly considered. This phenomenon is repeated every time models change and a different model is fed. Accordingly, the production efficiency of the mobility production system may decline and the daily target production amount of mobilities may not be achieved. After all, the application of the convention production system to the mixed production system adversely affects the overall vehicle production plan.

On the other hand, as shown in the lower part of FIG. 1, the idle time between the cells may be minimized by reassigning the works to be performed in each cell for the respective models to be fed according to the feeding order in consideration of the difference in working times between different models.

For example, considering that the total working time and working time in Cell 1 are shorter for Seq 2 (model B), the working time of Seq1 (model A) in Cell 1 may be extended and the working time of the same in Cell 2 may be shortened. That is, the working time in each cell may be adjusted by reassigning the working process performed in each cell for the same total working time of Seq1 (model A). Accordingly, the idle time between the work completion time in Cell 1 and the work start time in Cell 2 of Seq2 (model B) is reduced.

Sequentially, work reassignment may be implemented such that the working time in Cell 2 of Seq 2 (model B) is extended and the working time in Cell 3 is shortened in consideration of Cell 1 of Seq 3 (model A) and Cell 3 of Seq 1 (model A), which have a relatively long total working time. Accordingly, the idle time between the work completion time in Cell 1 and the work start time in Cell 2 of the Seq 3 (model A) is reduced. Eventually, the total production time of mobilities is minimized when the production system of embodiments of the present invention is applied to mixed production.

In this way, the method of operating the cell-based mobility production system according to an embodiment of the present invention reassigns the works for the respective vehicles based on the vehicle feeding order to solve the basic problem of the work delay that may occur in a multi-model mixed production line. Through this, the method of operating the cell-based mobility production system according to an embodiment of the present invention prepares a flexible production plan having a high degree of freedom and promotes productivity improvement.

The lower part of FIG. 1 is a view showing a production system to which the cell-based mobility production system according to an embodiment of the present invention is applied, and, in the reassigning of the works, the works required in each cell for the vehicle bodies to be fed may be reassigned such that the total production time of the vehicle bodies to be fed according to the determined feeding order satisfies the minimum production time.

Specifically, the works may be reassigned such that the difference between the work completion time of Seq 1 (model A) in Cell 2 and the work start time of Seq 2 (model B) in Cell 2 is minimized. To this end, the works in each cell may be reassigned such that the working time of Seq 1 (model A) in Cell 2 is reduced and the working time of Seq 1 (model A) in Cells 1 and 3 is extended.

Similarly, the works may be reassigned such that the difference between the work completion time of Seq 2 (model B) in Cell 2 and the work start time of Seq 3 (model A) in Cell 2 is minimized. To this end, the works in each cell may be reassigned such that the working time of Seq 2 (model B) in Cell 2 is extended and the working time of Seq 2 (model B) in Cells 1 and 3 is reduced.

In this way, the works required in each cell for the respective vehicle bodies to be fed may be reassigned such that the total working time for vehicle bodies to be fed satisfies the minimum working time.

TABLE 2 below illustrates the works that may be reassigned to other cells among the works performed in the process of TE1 and the other cells to which the reassignment is possible.

TABLE 2

| line | process | system | work title | movable process (automation items are fixed and automated processes are not considered) |
|---|---|---|---|---|
| trim | TE1 | moving | RR door removal (LH/RH) | current position |
| trim | TE1 | interior | roof gusset fastening | TE2/TE3/TE4 |
| trim | TE1 | interior | installation of two plugs (two cowl upper panels) C/PAD(TA1) | move to TE4 |

TABLE 2-continued

| line | process | system | work title | movable process (automation items are fixed and automated processes are not considered) |
|---|---|---|---|---|
| trim | TE1 | interior | installation of two plugs (two cowl upper panels) C/PAD(TA1) | move to TE4 |
| trim | TE1 | interior | installation of four plugs (2/2 fender aprons) | ALL |
| trim | TE1 | interior | installation of one plug (rear floor panel) | move to TE3 |

On the other hand, some parts in the automated process also may be reassigned to the manual process. Also, a link may be arranged such that work information and logistics information are automatically revised when the assignment is changed through this process.

FIG. 2 is a view showing steps of determining a feeding order of vehicle bodies in a cell-based mobility production system according to an embodiment of the present invention. As shown in FIG. 2, data required for vehicle production is inputted (including, e.g., working time, model/specification/quantity information, order and delivery information, and inventory, production constraints, and the like), a weekly vehicle production plan and a daily production plan including Sequence (SEQ), which is a vehicle feeding order, are prepared through the advanced planning and scheduling (APS), and a plan for daily/weekly vehicle target production amount and a plan for required materials are fixed. At this time, an algorithm for a mathematical optimization based on the above may be employed to determine the vehicle body feeding order. Here, object functions of the mathematical optimization algorithm may be the work completion time of all vehicle bodies and the standby time of the respective vehicle bodies. Here, constraints may include moving time, working time, order and delivery time, inventory and production constraints, and prohibition of simultaneous works in cells of the respective vehicle bodies. Here, critical variables may include the feeding order and feeding time of the respective vehicle bodies.

As shown in TABLE 1, various types of works that may be performed in each cell may be defined. In particular, movements between cells connected in parallel entail differences in production time depending on various moving paths. In addition, the working time in a cell also differs depending on what cells the vehicle body has gone through to the present cell. Accordingly, the method of operating the cell-based mobility production system according to an embodiment of the present invention sets the optimal moving path depending on the work assignment for the respective vehicles to minimize the total production time of the vehicle bodies.

FIG. 3 is a flowchart of a method of operating a cell-based mobility production system according to an embodiment of the present invention. The method of operating the cell-based mobility production system according to an embodiment of the present invention is a method of operating a system for producing various types of mobilities through a plurality of cells connected in series or parallel. The method includes assigning works required in each cell that the vehicle bodies matched by respective mobility need to go through and determining a feeding order of the vehicle bodies in consideration of the assigned works (S102) and reassigning the works required in each cell that the respective vehicle bodies to be fed need to go through in consideration of the determined feeding order (S104).

In addition, FIG. 3 is a flowchart of a method of operating a cell-based mobility production system according to an embodiment of the present invention. By the method of operating the cell-based mobility production system according to an embodiment of the present invention, in the determining of the feeding order of the vehicle bodies (S102), a plurality of expected production plans different from each other in the feeding order of the vehicle bodies may be prepared and an expected production plan having the shortest total working time may be selected as an optimal expected production plan among the expected production plans. And, in the determining of the feeding order of the vehicle bodies (S102), a plurality of expected production plans different from each other in the feeding order of the vehicle bodies may be prepared and an expected production plan having the shortest standby time between the vehicle bodies to be fed may be selected as an optimal expected production plan among the expected production plans. That is, the feeding order of the vehicle bodies which minimizes the object functions (total working time and standby time between the vehicle bodies) under the constraints may be set in the mathematical optimization model.

And, in the reassigning of the works (S104), the works required in each cell for the vehicle bodies to be fed may be reassigned in consideration of the determined feeding order and sequential relationships between the respective works. And, in the reassigning of the works (S104), the works required in each cell for the vehicle bodies to be fed may be reassigned in consideration of the determined feeding order and possible and impossible works in the respective cells. That is, the works may be reassigned towards finding critical variables that minimize the object functions in consideration of various sets of constraints (sequential relationships between the respective works and impossible works in the respective cells) in the mathematical optimization model.

In addition, FIG. 3 is a flowchart of a method of operating a cell-based mobility production system according to an embodiment of the present invention, and the method of operating the cell-based mobility production system according to an embodiment of the present invention may further include detecting a work delay in a specific cell occurring when the vehicle bodies are fed according to the feeding order (not shown), after the reassigning of the works (S104), and the reassigning of the works onward may be performed again when a work delay occurs. That is, the occurrence of a work delay may be simulated through a digital twin and a plan that prevents the occurrence in advance may be prepared again.

On the other hand, FIG. 3 is a flowchart of a method of operating a cell-based mobility production system according to an embodiment of the present invention, and the method of operating the cell-based mobility production system of an embodiment of the present invention is a method of operating a system for producing various types of mobilities through a plurality of cells connected in series or parallel. The method may include assigning works required in each cell that the vehicle bodies matched by respective mobility need to go through and determining a feeding order of the vehicle bodies in consideration of the assigned works (S102), reassigning the works required in each cell that the respective vehicle bodies to be fed need to go through in consideration of the determined feeding order (S104), and planning a logistics flow required for each cell in consideration of the determined feeding order and the reassigned works (S202). That is, another embodiment of the present invention may optimize the work allocation by drawing up a logistics plan for supplying and moving parts together.

Here, in the assigning of the works (S102), the works may be assigned in consideration of the target production amount of each mobility. In addition, in the determining of the feeding order (S102), the feeding order may be determined in consideration of the total production time of the vehicle bodies to be fed according to the feeding order.

On the other hand, FIG. 3 is a flowchart of a method of operating a cell-based mobility production system according to an embodiment of the present invention. The method of operating the cell-based mobility production system according to an embodiment of the present invention may further include detecting an occurrence of a logistics flow issue including a collision or congestion in the logistics flow occurring when the vehicle bodies are fed according to the feeding order (S302) after the planning of the logistics flow (S202), and when a logistics flow issue arises, the planning of the logistics flow (S202) onward may be performed again. That is, by the method of operating the cell-based mobility production system according to the embodiment of the present invention, the logistics plan may be revised in reflection of the simulation result of the logistics flow issues.

FIG. 3 is a flowchart of a method of operating a cell-based mobility production system according to an embodiment of the present invention. The method of operating the cell-based mobility production system according to an embodiment of the present invention may further include detecting a work delay in a specific cell when the vehicle bodies are fed according to the feeding order (not shown) after the planning of the logistics flow (S202), and the reassigning of the works onward may be performed again when a work delay occurs. That is, by the method of operating the cell-based mobility production system according to the embodiment of the present invention, the work assignment may be revised in reflection of the simulation result of the work delay issue.

FIG. 3 is a flowchart of a method of operating a cell-based mobility production system according to an embodiment of the present invention, and the method of operating the cell-based mobility production system according to an embodiment of the present invention may further include detecting a possibility or an impossibility of achieving the target production amount of each mobility when the vehicle bodies are fed according to the feeding order (S402) after the planning of the logistics flow (S202), and the reassigning of the works (S104) onward may be performed again when it is determined that the target cannot be achieved. That is, by the method of operating the cell-based mobility production system according to an embodiment of the present invention, the work assignment may be revised in reflection of the simulation result to overcome the impossibility of achieving the planned target amount. The method may further include fixing and applying the smart factory operation plan when it is determined that the target can be achieved (S500).

TABLES 3 and 4 below show an example of production information, including the daily target production quantity for each process and production model, and processes that can be performed and reassigned for the respective vehicle models. TABLE 5 below shows a simulation result listing reduction rates of the overall total production time and the lead time for the respective vehicle models on the basis of a mixed production according to the determined feeding order as compared with the conventional invention (As-Is)

that mathematically optimizes the work assignment based on a single vehicle model production under the constraints of TABLES 3 and 4.

In this way, the cell-based mobility production system according to the embodiment of the present invention achieves a reduction in the total production time while eliminating errors in the work assignment and the logistics flow through a digital twin simulation.

TABLE 3

| process (cell): 19 cells in total | vehicle model | number of vehicles produced (96 in total) |
|---|---|---|
| TE1 | 0 | 13 |
| TE2 | 1 | 15 |
| TE3 | 2 | 13 |
| TE4 | 3 | 11 |
| TE5 | 4 | 11 |
| PM | 5 | 11 |
| CM1/2 | 6 | 11 |
| AM | 7 | 11 |
| FD1 | | |
| FD2 | | |
| FD3 | | |
| FD4 | | |
| FD5 | | |
| FD6 | | |
| FE1 | | |
| FE2 | | |
| FE3 | | |
| FE4 | | |
| FE5 | | |

TABLE 4

| process (cell) | model 0 | model 1 | model 2 | model 3 | model 4 | model 5 | model 6 | model 7 | movable process |
|---|---|---|---|---|---|---|---|---|---|
| | 1, if performed in the current cell; 0, otherwise | | | | | | | | |
| TE1 | 0 | 0 | 0 | 0 | 0 | 0 | 0 | 0 | current position |
| TE1 | 0 | 0 | 0 | 0 | 0 | 0 | 0 | 0 | current position |
| TE1 | 0 | 0 | 0 | 0 | 0 | 0 | 0 | 0 | current position |
| TE1 | 1 | 1 | 1 | 1 | 1 | 1 | 0 | 1 | current position |
| TE1 | 1 | 1 | 1 | 1 | 1 | 1 | 1 | 1 | current position |
| TE1 | 1 | 0 | 1 | 1 | 1 | 1 | 1 | 1 | current position |
| TE1 | 1 | 1 | 1 | 1 | 1 | 1 | 1 | 1 | current position |
| TE1 | 1 | 1 | 1 | 1 | 0 | 1 | 1 | 1 | TE2/TE3/TE4 |
| TE1 | 1 | 1 | 1 | 1 | 1 | 1 | 1 | 1 | move to TE4 |
| TE1 | 1 | 1 | 1 | 1 | 1 | 1 | 1 | 1 | move to TE4 |
| TE1 | 1 | 1 | 1 | 1 | 1 | 1 | 1 | 1 | ALL |
| TE1 | 1 | 1 | 1 | 1 | 1 | 1 | 1 | 1 | move to TE3 |
| TE1 | 1 | 1 | 1 | 1 | 1 | 1 | 1 | 1 | move to TE3 |
| TE1 | 1 | 1 | 1 | 1 | 1 | 1 | 1 | 1 | ALL |
| TE1 | 1 | 1 | 1 | 1 | 1 | 1 | 1 | 1 | ALL |
| TE1 | 1 | 0 | 1 | 1 | 1 | 1 | 1 | 1 | move to TE3 |
| TE1 | 1 | 1 | 1 | 1 | 1 | 1 | 1 | 1 | ALL |
| TE1 | 1 | 1 | 1 | 1 | 1 | 1 | 1 | 1 | current position |
| TE1 | 1 | 1 | 1 | 1 | 1 | 1 | 1 | 1 | move to AM |
| TE1 | 1 | 1 | 1 | 1 | 1 | 1 | 1 | 1 | current position |
| TE1 | 1 | 1 | 1 | 1 | 1 | 1 | 1 | 1 | current position |
| TE1 | 1 | 1 | 1 | 1 | 1 | 1 | 1 | 1 | current position |
| TE1 | 1 | 1 | 1 | 1 | 1 | 1 | 1 | 1 | current position |
| TE1 | 1 | 0 | 1 | 1 | 1 | 1 | 1 | 1 | current position |
| TE1 | 1 | 1 | 1 | 1 | 1 | 1 | 1 | 1 | current position |
| TE1 | 1 | 1 | 1 | 1 | 1 | 1 | 1 | 1 | TE3/TE4/TE5 |

TABLE 5

| comparison of total production time <unit:hr.> | | | | |
|---|---|---|---|---|
| | To-Be work assignment for respective vehicles | As-Is single work assignment | reduction rate of production time | reduction rate of production time |
| total production time (hr.) | 20.81 | 26.13 | −5.32 | −20% |
| average production time per vehicle body (hr.) | 2.87 | 2.95 | −0.08 | −3% |

| comparison of lead time for respective models | | | | |
|---|---|---|---|---|
| To-Be work assignment for respective vehicles | | As-Is single work assignment | | reduction |
| model | average lead time | model | lead time | rate of lead time |
| 0 | 181.9 | 0 | 182.1 | −0.1% |
| 1 | 160.2 | 1 | 167.9 | −4.6% |
| 2 | 169.9 | 2 | 178.2 | −4.6% |
| 3 | 179.9 | 3 | 179.8 | 0.1% |
| 4 | 164.3 | 4 | 173.4 | −5.3% |
| 5 | 177.4 | 5 | 180.8 | −1.9% |
| 6 | 179.4 | 6 | 180.1 | −0.4% |
| 7 | 167.4 | 7 | 177 | −5.4% |

As described above, specific embodiments of the present invention are illustrated and described, but it will be self-evident to those skilled in the art that the present invention may be improved upon and modified in various ways within the scope not departing from the technical spirit of the present invention provided by the patent claims below.

What is claimed is:

1. A method of operating a cell-based mobility production system for producing various types of mobilities, the method comprising:

assigning works required in each cell of a plurality of cells connected in series or in parallel that vehicle bodies need to go through based on a type of a mobility to be produced;

determining a feeding order of the vehicle bodies based on the assigned works and the type of the mobility to be produced;

reassigning the works required in each cell that the vehicle bodies to be fed need to go through based on the feeding order of the vehicle bodies; and assembling the various types of mobilities by performing the reassigned works on the vehicle bodies fed into each cell, wherein:

each of assigning the works, determining the feeding order, and reassigning the works is performed by a processor, and reassigning the works comprises reassigning the works required in each cell for the vehicle bodies to be fed based on the determined feeding order and workload differences between a preceding vehicle body and a following vehicle body so as to minimize idle time between adjacent cells.

2. The method of claim 1, wherein reassigning the works required in each cell comprises reassigning the works such that a total production time of the vehicle bodies to be fed according to the determined feeding order satisfies a minimum production time.

3. The method of claim 1, further comprising:

after reassigning the works, detecting a work delay in a specific cell when the vehicle bodies are fed based on the determined feeding order; and reassigning the works again in response to detecting the work delay.

4. The method of claim 1, wherein reassigning the works comprises:

preparing a plurality of expected reassignments in which the works required in each cell for the vehicle bodies to be fed based on the determined feeding order are assigned; and selecting an optimal reassignment from among the plurality of expected reassignments, wherein a total production time of the vehicle bodies to be fed based on the determined feeding order satisfies a minimum production time in the optimal reassignment.

5. The method of claim 1, wherein determining the feeding order of the vehicle bodies comprises:

preparing a plurality of expected production plans different from each other in the feeding order of the vehicle bodies; and selecting an optimal expected production plan from among the plurality of expected production plans that has a shortest total working time.

6. The method of claim 1, wherein determining the feeding order of the vehicle bodies comprises:

preparing a plurality of expected production plans different from each other in the feeding order of the vehicle bodies; and selecting an optimal expected production plan from among the plurality of expected production plans that has a shortest standby time.

7. The method of claim 1, wherein reassigning the works comprises reassigning the works required in each cell for the vehicle bodies to be fed based on the determined feeding order and possible and impossible works in the respective cells.

8. The method of claim 1, further comprising planning a logistics flow required in each cell based on the feeding order and the reassigned works.

9. A method of operating a cell-based mobility production system for producing various types of mobilities, the method comprising:

assigning works required in each cell of a plurality of cells connected in series or in parallel that vehicle bodies need to go through based on a type of a mobility to be produced;

determining a feeding order of the vehicle bodies based on the assigned works and the type of the mobility to be produced;

reassigning the works required in each cell that the vehicle bodies to be fed need to go through based on the feeding order of the vehicle bodies; and assembling the various types of mobilities by performing the reassigned works on the vehicle bodies fed into each cell, wherein reassigning the works comprises reassigning the works required in each cell for the vehicle bodies to be fed based on the determined feeding order and workload differences between a preceding vehicle body and a following vehicle body so as to minimize idle time between adjacent cells.

10. The method of claim 9, further comprising planning a logistics flow required in each cell based on the feeding order and the reassigned works.

11. The method of claim 10, further comprising:

after planning the logistics flow, detecting an occurrence or non-occurrence of a logistics flow issue during feeding of the vehicle bodies based on the feeding order; and performing planning the logistics flow again in response to detecting the occurrence of the logistics flow issue.

12. The method of claim 11, wherein the logistics flow issue comprises a collision or congestion in the logistics flow.

13. The method of claim 10, further comprising:

after planning the logistics flow, detecting a work delay in a specific cell when the vehicle bodies are fed based on the feeding order; and in response to detecting the work delay, performing reassigning the works and planning the logistics flow again.

14. The method of claim 10, further comprising, after planning the logistics flow, detecting possibility or impossibility of achieving a target production amount of each mobility when the vehicle bodies are fed based on the feeding order.

15. The method of claim 14, wherein detecting the possibility or impossibility comprises detecting the impossibility of achieving the target production amount, the method further comprising reassigning the works and planning the logistics flow again in response to detecting the impossibility of achieving the target production amount.

16. The method of claim 14, wherein detecting the possibility or impossibility comprises detecting the possibility of achieving the target production amount, the method further comprising fixing and applying a smart factory operation plan in response to detecting the possibility of achieving the target production amount.

17. A cell-based mobility production system for producing various types of mobilities, the cell-based mobility production system comprising:

a plurality of cells connected in series or in parallel, wherein the cells are configured to receive vehicle bodies and modify the vehicle bodies based on a type of a mobility to be produced; and a processor configured to:

assign works required in each cell of the plurality of cells based on the type of the mobility to be produced;

determine a feeding order of the vehicle bodies to be fed based on the assigned works and the type of the mobility to be produced;

reassign the works required in each cell based on the feeding order of the vehicle bodies; and control each of the plurality of cells to perform the reassigned works on the corresponding vehicle bodies to thereby assemble the various types of mobilities, wherein, to reassign the works, the processor is further configured to reassign the works required in each cell for the vehicle bodies to be fed based on the determined feeding order and workload differences between a preceding vehicle body and a following vehicle body so as to minimize idle time between adjacent cells.

18. The cell-based mobility production system of claim 17, wherein the processor is configured to reassign the works such that a total production time of the vehicle bodies to be fed based on the determined feeding order satisfies a minimum production time.

* * * * *